(12) United States Patent
Craft et al.

(10) Patent No.: US 8,925,502 B1
(45) Date of Patent: Jan. 6, 2015

(54) HYDRAULICALLY ACTUATED VALVE ASSEMBLY FOR AN ENGINE

(75) Inventors: Todd D. Craft, Pleasant Prairie, WI (US); Kenneth Chung, Lindenhurst, IL (US); Roger Raetzman, Pleasant Prairie, WI (US); Patrick C. Tetzlaff, Caledonia, WI (US); Tony Urbanik, Kenosha, WI (US); Peter Lucier, Chicago, IL (US)

(73) Assignee: BRP US Inc., Sturtevant, WI (US)

( * ) Notice: Subject to any disclaimer, the term of this patent is extended or adjusted under 35 U.S.C. 154(b) by 957 days.

(21) Appl. No.: 13/011,473

(22) Filed: Jan. 21, 2011

Related U.S. Application Data

(60) Provisional application No. 61/297,541, filed on Jan. 22, 2010.

(51) Int. Cl.
   *F02B 25/00* (2006.01)
   *F02D 13/02* (2006.01)
   *F02F 1/22* (2006.01)

(52) U.S. Cl.
   USPC .................................. 123/65 PE; 123/90.12

(58) Field of Classification Search
   USPC .......... 123/90.12, 90.13, 65 PE, 65 V, 65 VA, 123/65 R, 61 R, 71 VA, 73 AV, 65 VD
   See application file for complete search history.

(56) References Cited

U.S. PATENT DOCUMENTS

| | | | |
|---|---|---|---|
| 4,397,272 A | 8/1983 | Omote | |
| 4,621,596 A | 11/1986 | Uchinishi | |
| 4,763,613 A | 8/1988 | Arahata et al. | |
| 4,766,854 A | 8/1988 | Riese | |
| 4,864,980 A | 9/1989 | Riese | |
| 4,998,512 A | 3/1991 | Masuda et al. | |
| 5,000,131 A | 3/1991 | Masuda | |
| 5,063,887 A | 11/1991 | Ozawa et al. | |
| 5,063,888 A | 11/1991 | Ozawa et al. | |

(Continued)

FOREIGN PATENT DOCUMENTS

| | | |
|---|---|---|
| AT | 407555 B | 4/2001 |
| DE | 2927521 A | 1/1981 |

(Continued)

OTHER PUBLICATIONS

English abstract of JP 05133230, Oct. 27, 1995.

(Continued)

*Primary Examiner* — Thomas Denion
*Assistant Examiner* — Daniel Bernstein
(74) *Attorney, Agent, or Firm* — BCF LLP

(57) ABSTRACT

An internal combustion engine has at least two exhaust ports and a valve assembly. The valve assembly has first and second connectors, first and second actuator pistons connected to their corresponding connectors, the first and second actuator pistons being disposed in first and second chambers respectively, and first and second valves connected to their corresponding connectors. The first connector, actuator piston and valve are movable together between first and second positions. The second connector, actuator piston, and valve are movable together between first and second positions. A first fluid line supplies hydraulic fluid in the first and second chambers on a first side of the first and second actuator pistons. A second fluid line supplies hydraulic fluid in the first and second chambers on a second side of the first and second actuator pistons. At least one fluid pump supplies hydraulic fluid to the first and second fluid lines.

9 Claims, 13 Drawing Sheets

(56) References Cited

U.S. PATENT DOCUMENTS

| | | |
|---|---|---|
| 5,220,890 A | 6/1993 | Koriyama |
| 5,373,816 A | 12/1994 | Asai et al. |
| 5,410,993 A | 5/1995 | Masuda et al. |
| 5,537,958 A | 7/1996 | Nishimura et al. |
| 5,575,246 A | 11/1996 | Ito |
| 5,598,813 A | 2/1997 | Masuda et al. |
| 5,605,119 A | 2/1997 | Masuda et al. |
| 5,832,881 A | 11/1998 | Karay et al. |
| 5,873,334 A | 2/1999 | Heinrich |
| 6,021,748 A | 2/2000 | Motose |
| 6,164,251 A | 12/2000 | Nishimura et al. |
| 6,178,935 B1 * | 1/2001 | Diehl et al. ............... 123/90.12 |
| 6,244,227 B1 | 6/2001 | Matte |
| 7,007,642 B2 * | 3/2006 | Diehl et al. ............... 123/90.12 |
| 7,213,544 B2 | 5/2007 | Zauner |
| 7,367,295 B2 | 5/2008 | Zauner |
| 7,762,220 B2 * | 7/2010 | Okanovic et al. ......... 123/65 PE |
| 8,146,547 B2 * | 4/2012 | Lou ............................. 123/90.12 |
| 2009/0206288 A2 * | 8/2009 | Schiemann ............... 251/129.01 |

FOREIGN PATENT DOCUMENTS

| | | |
|---|---|---|
| JP | 05133230 A2 | 5/1993 |
| JP | 07279675 A2 | 10/1995 |
| JP | 10153272 A | 6/1998 |
| JP | 11132045 A1 | 5/1999 |

OTHER PUBLICATIONS

English abstract of AT 407555, Sep. 15, 2008.
English abstract of JP 7279675, May 25, 1993.
English abstract of JP 10153272, Jun. 9, 1998.
English abstract of JP 11132045, May 18, 1999.

* cited by examiner

HYDRAULICALLY ACTUATED VALVE ASSEMBLY FOR AN ENGINE

CROSS-REFERENCE

The present application claims priority to U.S. Provisional Application No. 61/297,541, filed Jan. 22, 2010, the entirety of which is incorporated herein by reference.

FIELD OF THE INVENTION

The present invention relates to a hydraulically actuated valve assembly suitable for use with one or more exhaust ports of an internal combustion engine.

BACKGROUND

In order to ensure that two-stroke engines have a high power capacity at high speeds, a high volumetric efficiency is required and the charge losses must be minimized. This can be accomplished by an early and therefore higher opening of the exhaust passage into the cylinder. The adjustment of the exhaust port, to obtain maximum power capacity of the engine at high speeds involves, in the medium speed range, not only an appreciable decrease of the useful stroke, but also a large increase of the charge losses. As a result, the torque decreases and the specific fuel consumption increases greatly. A higher torque in conjunction with a lower fuel consumption can be obtained, at lower engine speeds, only if the opening of the exhaust port happens later in the down stroke of the piston which means that the exhaust port must be at a lower position than it is at high engine speeds.

For this purpose it is known to provide, in the exhaust port, a valve which is movable between a full flow position and a flow restricting position. When in the flow restricting position, the end of the valve is substantially flush with the peripheral surface of the cylinder bore. In this flow restricting position, the exhaust port is effectively lowered in relation to the down stroke of the piston. The valve is adjustable to vary the relative height of the exhaust port as is required by the given operating conditions of the engine.

To control the position of the valve, various types of actuators have been provided. One such type of actuator is a pneumatic actuator having a diaphragm such as the one described in United States Patent Publication No. 2009/0088942 A1, published Apr. 2, 2009, the entirety of which is incorporated herein by reference. Although, actuators of this type adequately control the position of the valve, they have a substantial amount of parts which increases the complexity, assembly time and cost of the valve assembly.

Furthermore, valves of the type described above need to be lubricated. This typically requires that a number of fluid lines be connected to the valve assembly in order to supply the required lubricant. This further increases the complexity, assembly time and cost of the valve assembly.

Therefore there is a need for a valve assembly having an actuator with a reduced number of parts.

There is also a need for a system for supplying lubricant to the valve assembly.

SUMMARY

It is an object of the present invention to ameliorate at least some of the inconveniences present in the prior art.

It is also an object of the present invention to provide a hydraulically actuated valve assembly.

It is a further objected of the present invention to provide an internal combustion engine having a plurality of exhaust ports and a plurality of hydraulically actuated valves. The valves are movable by hydraulic actuators which are supplied with hydraulic fluid via common fluid lines.

It is another object of the present invention to provide a housing defining therein the fluid lines and a portion of the actuators.

It is yet another object of the present invention to provide a hydraulically actuated valve assembly which uses lubricant from its associated engine as the hydraulic fluid, thereby lubricating the valve assembly in addition to actuating the valve assembly.

In one aspect, the invention provides an internal combustion engine having a crankcase, a crankshaft disposed in the crankcase, a cylinder block connected to the crankcase, first and second cylinders disposed in the cylinder block, the first cylinder having a first exhaust port, the second cylinder having a second exhaust port, a first piston movably disposed within the first cylinder and a second piston movably disposed within the second cylinder, the first and second pistons being operatively connected to the crankshaft, and a valve assembly connected to the cylinder block. The valve assembly has a first connector, a first actuator piston connected to the first connector, the first actuator piston being disposed in a first chamber, a first valve connected to the first connector, a second connector, a second actuator piston connected to the second connector, the second actuator piston being disposed in a second chamber, and a second valve connected to the second connector. The first connector, the first actuator piston and the first valve are movable together between a first position where the first valve extends a first distance in the first exhaust port and a second position where the first valve extends a second distance in the first exhaust port. The second distance is less than the first distance. The second connector, the second actuator piston, and the second valve are movable together between a first position where the second valve extends a first distance in the second exhaust port and a second position where the second valve extends a second distance in the second exhaust port. The second distance is less than the first distance. A first fluid line supplies hydraulic fluid in the first chamber on a first side of the first actuator piston to move the first connector, the first actuator piston and the first valve toward the first position. The first fluid line also supplies hydraulic fluid in the second chamber on a first side of the second actuator piston to move the second connector, the second actuator piston and the second valve toward the first position. A second fluid line supplies hydraulic fluid in the first chamber on a second side of the first actuator piston to move the first connector, the first actuator piston and the first valve toward the second position. The second fluid line also supplies hydraulic fluid in the second chamber on a second side of the second actuator piston to move the second connector, the second actuator piston and the second valve toward the second position. At least one fluid pump supplies hydraulic fluid to the first and second fluid lines.

In a further aspect, a housing defines therein the first chamber, the second chamber, the first fluid line, and the second fluid line.

In an additional aspect, the housing is connected to the cylinder block.

In a further aspect, an exhaust manifold is connected to the cylinder block and is fluidly connected to the first and second exhaust port. The exhaust manifold is disposed between the housing and the crankshaft.

In an additional aspect, a third cylinder is disposed in the cylinder block. The third cylinder has a third exhaust port. A third piston is movably disposed within the third cylinder. The third piston is operatively connected to the crankshaft. The valve assembly also has a third connector, a third actuator piston connected to the third connector, the third actuator piston being disposed in a third chamber, and a third valve connected to the third connector. The third connector, the third actuator piston and the third valve are movable together between a first position where the third valve extends a first distance in the third exhaust port and a second position where the third valve extends a second distance in the third exhaust port. The second distance is less than the first distance. The first fluid line also supplies hydraulic fluid in the third chamber on a first side of the third actuator piston to move the third connector, the third actuator piston and the third valve toward the first position. The second fluid line also supplies hydraulic fluid in the third chamber on a second side of the third actuator piston to move the third connector, the third actuator piston and the third valve toward the second position.

In a further aspect, a first hydraulic valve selectively fluidly communicates the first fluid line with the at least one fluid pump, and a second hydraulic valve selectively fluidly communicates the second fluid line with the at least one fluid pump.

In an additional aspect, a hydraulic fluid reservoir fluidly communicates with the at least one fluid pump for supplying hydraulic fluid to the at least one fluid pump.

In a further aspect, the hydraulic fluid reservoir is a lubricant reservoir and the hydraulic fluid is a lubricant used to lubricate the engine.

In an additional aspect, the valve assembly further also has a first spring biasing the first connector, the first actuator piston and the first valve toward one of the first position, the second position and a third position. The third position is intermediate the first and second positions. A second spring biases the second connector, the second actuator piston and the second valve toward one of the first position, the second position and a third position. The third position is intermediate the first and second positions.

In another aspect, the invention provides a valve assembly having a housing defining therein a chamber, a connector having a first end disposed inside the housing and a second end, an actuator piston connected to the first end of the connector, the actuator piston being disposed in the chamber, and a valve connected to the second end of the connector. The connector, the actuator piston and the valve are movable together between a first position where the valve extends a first distance from the housing and a second position where the valve extends a second distance from the housing. The second distance is less than the first distance. A first fluid line defined by the housing supplies hydraulic fluid in the chamber on a first side of the actuator piston to move the connector, the actuator piston and the valve toward the first position. A second fluid line defined by the housing for supplies hydraulic fluid in the chamber on a second side of the actuator piston to move the connector, the actuator piston and the valve toward the second position.

In a further aspect, the housing defines a passage therein. The passage extends from an outer surface of the housing to the chamber. The connector is disposed at least in part in the passage. The valve assembly also has a seal disposed in the passage around the connector. The seal prevents hydraulic fluid present in the chamber from flowing outside the housing via the passage.

In an additional aspect, a diameter of the passage is greater than a diameter of the chamber. The valve assembly also has an annular cap disposed inside the passage around the connector. The annular cap has an outer diameter corresponding to a diameter of the passage and an inner diameter being smaller than the diameter of the chamber. The seal is disposed between the annular cap and the connector.

In a further aspect, a spring biases the connector, the actuator piston and the valve toward one of the first position, the second position and a third position. The third position is intermediate the first and second positions.

In yet another aspect, the invention provides an internal combustion engine having a crankcase, a crankshaft disposed in the crankcase, a cylinder block connected to the crankcase, a cylinder disposed in the cylinder block, the cylinder having an exhaust port, a piston movably disposed within the cylinder, the piston being operatively connected to the crankshaft, and the above-described valve assembly connected to the cylinder block. The valve extends a third distance in the exhaust port when the first connector, the first actuator piston and the first valve are in the first position. the valve extends a fourth distance in the exhaust port when the first connector, the first actuator piston and the first valve are in the second position. The fourth distance is less than the third distance. At least one fluid pump supplies hydraulic fluid to the first and second fluid lines.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
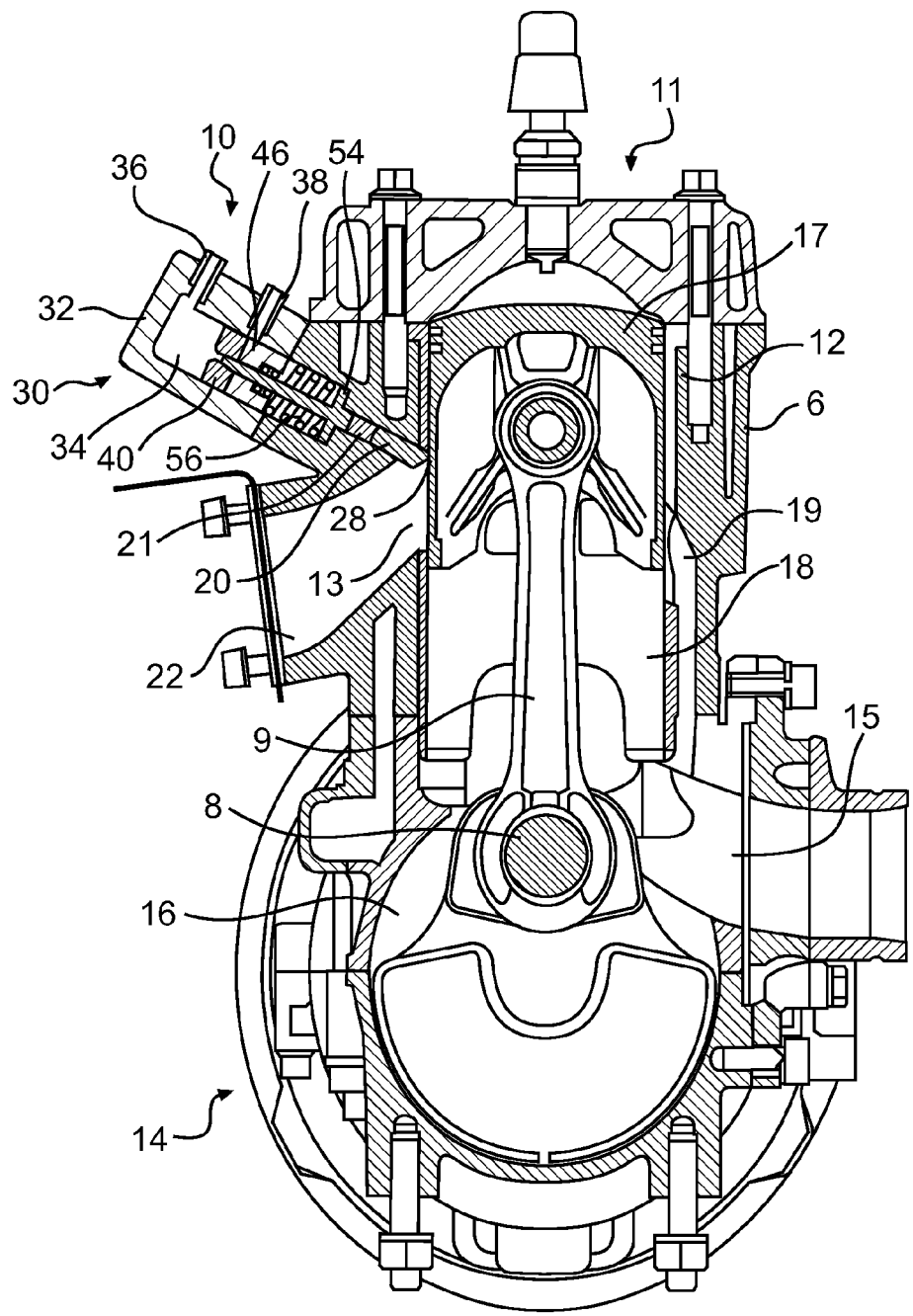
FIG. 1 is a cross-sectional view of an internal combustion engine have a first embodiment of a valve assembly.

As shown in FIG. 1, a valve assembly 10 in accordance with aspects of the present invention is operatively connected to a two-stroke engine 11. The valve assembly 10 comprises a valve actuator 30 and a valve 20 connected to the actuator 30. The valves 20 is a one-part valve, however it is contemplated that the valve may be a multi-part valve such as the valve described in United States Patent Publication No. 2009/0088942 A1, published Apr. 2, 2009. The engine 11 comprises a crankcase 14 and a cylinder block 6 connected to the crankcase 14. A cylinder 12 is disposed in the cylinder block 6 and has an exhaust port 13. It should be understood that the two-stroke engine 11 may have more than one cylinder 12, each having an exhaust port 13, in which case each exhaust port 13 would be provided with a valve assembly 10. The cylinder 12 may be formed in the cylinder block 6 in any suitable manner known in the art, such as by disposing a cylinder liner in a cylindrical bore formed in the cylinder block 6, or by coating the inner surface of the cylindrical bore with a suitable coating such as Nicasil. An exhaust passage 22 communicates with the cylinder 12 via the exhaust port 13. The crankcase 14 has an admission port 15 and an internal chamber 16. A crankshaft 8 is disposed in the internal chamber 16 of the crankcase 14. A piston 17 is connected to the crankshaft 8 via a connecting rod 9 and is reciprocable in the cylinder bore 18. The piston 17 is adapted to open or close the exhaust port 13 and a transfer port 19.

When the engine 11 is operating at low or medium speeds, the exhaust port 13 should not be exposed prematurely by the piston 17, as the latter moves downwardly. Such a premature exposure of the exhaust port 13 is prevented by the valve 20. The valve 20 is slidably mounted in a guide channel 21 having a longitudinal direction that is approximately radial with respect to cylinder bore 18 and extends at an acute angle to the axis of the exhaust passage 22. An edge 28 of the valve 20 is shaped so as to match the shape of the cylinder bore 18 of the cylinder 12. As will become apparent from the following description, the valve actuator 30 is adapted to move the valve 20 between a first flow restricting position, shown in FIG. 2, where the valve 20 extends a first distance in the exhaust port 13, a second full flow position, shown in FIG. 3, where the valve 20 is withdrawn from the exhaust port 13. The valve 20, when in the second position, does not significantly restrict the flow of exhaust gases through the exhaust port 13.

Figure 2:
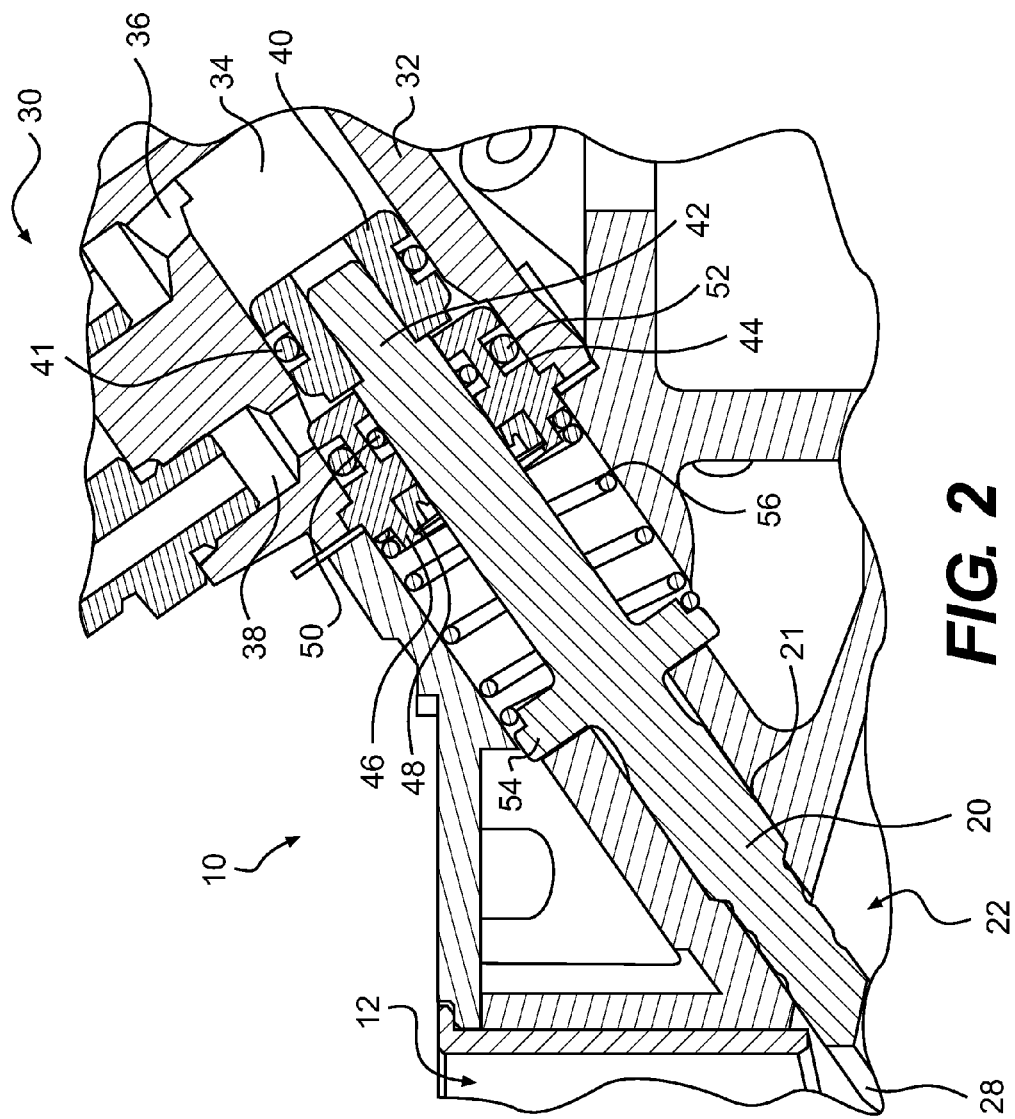
FIG. 2 is a close-up cross-sectional view of the valve assembly of FIG. 1 with a valve thereof in a flow restricting position.
Figure 3:
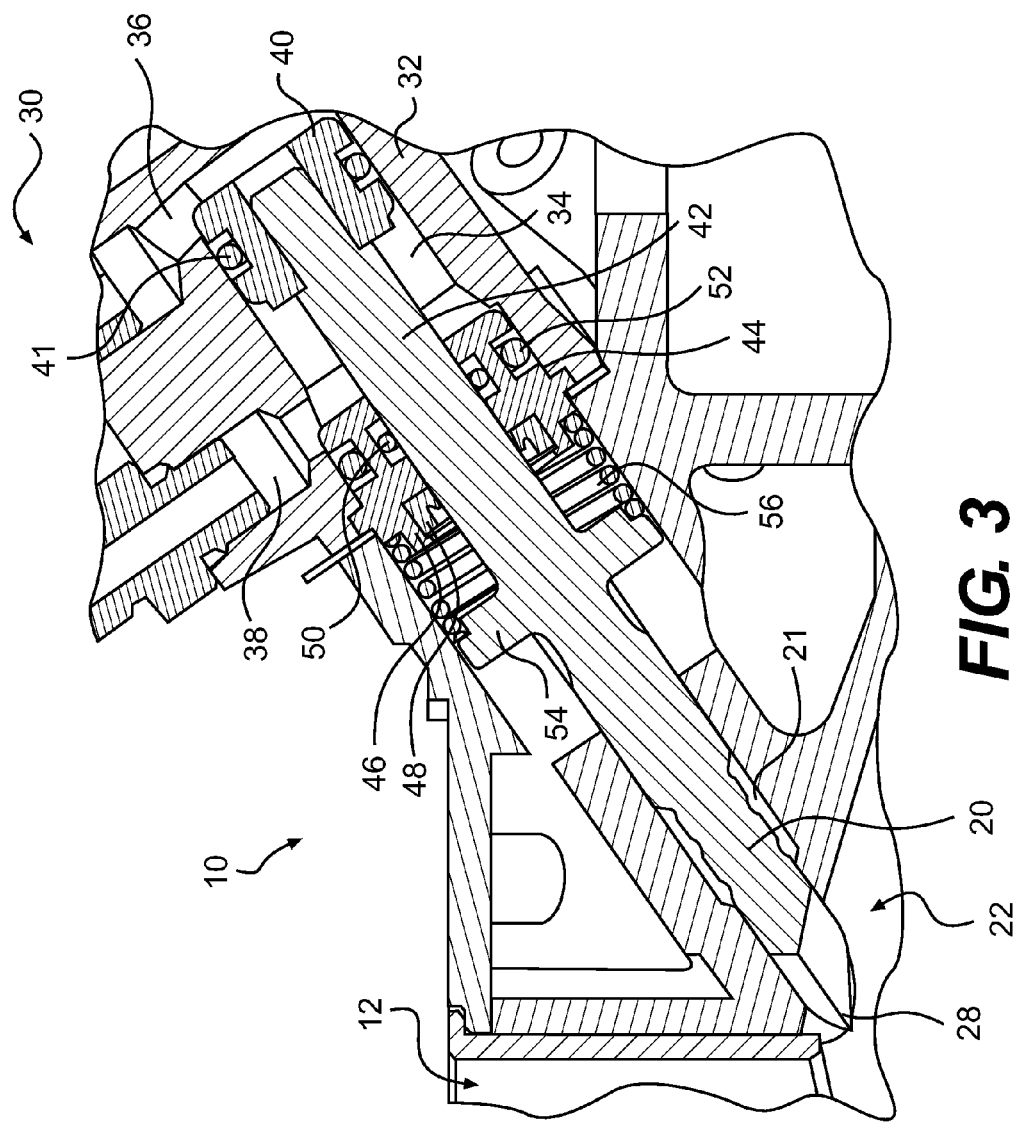
FIG. 3 is a close-up cross-sectional view of the valve assembly of FIG. 1 with the valve thereof in a full flow position.

Turning now to FIGS. 2 and 3, the valve assembly 10 will now be described in more detail. As mentioned above, the valve assembly 10 comprises the valve actuator 30 and the valve 20. The actuator 30 has a housing 32. The housing defines a chamber 34, a first fluid line 36 and a second fluid line 38. The first and second fluid line 36, 38 fluidly communicate the chamber 34 with a fluid pump (not shown) so as to supply hydraulic fluid to the chamber 34 as described below. An actuator piston 40 is disposed in the chamber 34 and is slidable therein. An O-ring 41 disposed around the actuator piston 40. The O-ring 41 prevents hydraulic fluid present in the chamber 34 from flowing around the actuator piston 40 from one side of the actuator piston 40 to the other. The actuator piston 40 and the chamber 34 are cylindrical, however, it is contemplated that they could have other shapes. The actuator piston 40 is mounted onto an end of a connector 42. The connector 42 extends from the housing 32 and connects to the valve 20, such that as the actuator piston 40 slides inside the chamber 34, the connector 42 and the valve 20 move with the actuator piston 40. In the embodiment shown, the connector 42 is integrally formed with the valve 20, however it is contemplated that they could be otherwise connected.

The housing 32 also defines a passage 44 therein. As can be seen, the passage 44 extends from an outer surface of the housing 32 to the chamber 34 and is coaxial with the chamber 34. A diameter of the passage 44 is greater than a diameter of the chamber 34 in order to facilitate the insertion of the actuator piston 40 into the chamber 34 when assembling the actuator 30. An annular cap 46 is disposed inside the passage 44 around the connector 42 is order to guide the connector 42 as it moves with the actuator piston 40. A seal 48 and an O-ring 50 are disposed between the annular cap 46 and the connector 42. Another O-ring 52 is disposed between the annular cap 46 and the wall of the passage 44. The seal 48 and the O-rings 50, 52 prevent hydraulic fluid present in the chamber 34 from flowing outside the housing 32 via the passage 44.

The valve 20 has a flange 54. A spring 56 is disposed around the connector 42 between the flange 54 and the annular cap 46. The spring 56 biases the valve 20, the connector 42 and the actuator piston 40 toward the flow restricting position shown in FIG. 2 for reasons explained further below.

When the engine 11 is operating at low or medium speeds, the fluid pump supplies hydraulic fluid to the chamber 34 via the fluid line 36 thus causing the actuator piston 40 to move toward the annular cap 46 as shown in FIG. 2. As a result, the valve 20 moves to the flow restricting position shown in FIG. 2.

When the engine 11 is operating at high speeds, the fluid pump supplies hydraulic fluid to the chamber 34 via the fluid line 38 thus causing the actuator piston 40 to move away from the annular cap 46 as shown in FIG. 3. As a result, the valve 20 moves to the full flow position shown in FIG. 3.

Should there be a failure of the hydraulic system supplying fluid to the actuator 30, it is contemplated that the engine 11 would enter a "limp-home" operation mode. In this mode, the speed of the engine 11 is limited to low engine speeds. Therefore, by having the spring 56 bias the valve 20 toward the flow restricting position shown in FIG. 2, the valve 20 is moved to the appropriate position for low speed operation even if the hydraulic system has failed. However, it is contemplated that the spring 56 could bias the valve 20 toward the full flow position shown in FIG. 3. It is also contemplated that the spring 56 could bias the valve 20 to a position intermediate the flow restricting position and the full flow position. This would allow the valve 20 to be moved to the flow restricting position at low engine speeds, to the intermediate position a medium engine speeds, and to the full flow position at high engine speeds.

Turning now to FIGS. 4 to 7, another embodiment of a valve assembly, valve assembly 100, will be described. The valve assembly 100 has three valves 120 operatively connected to a single housing 132.

Figure 4:
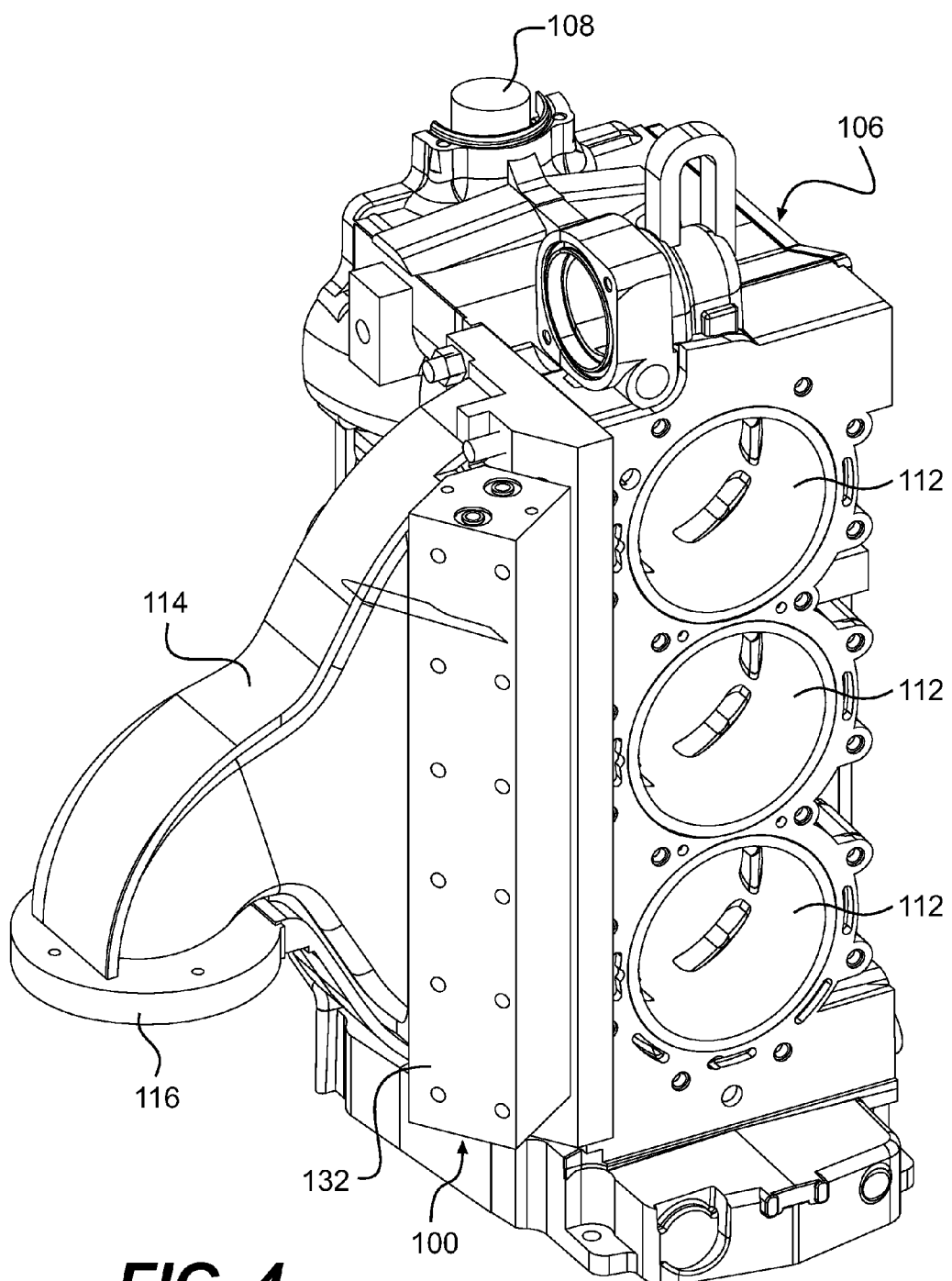
FIG. 4 is a perspective view of a cylinder block with an exhaust manifold and a second embodiment of a valve assembly connected thereto.

As seen in FIG. 4, the valve assembly 100 is provided on a two-stroke engine (only the cylinder block 106 and the crankshaft 108 of which are shown). Although not shown, the engine also has a crankcase, three pistons, and three connecting rods as well as other components necessary for its proper operation as would be understood by those skilled in the art. The housing 132 of the valve assembly 100 is connected to the cylinder block 106 as shown. Three cylinders 112, disposed in the cylinder block 106, each have a respective exhaust port (not shown). The cylinders 112 may be formed in the cylinder block 106 in any suitable manner known in the art, such as by disposing cylinder liners in respective cylindrical bores formed in the cylinder block 106, or by coating the inner surface of each of the cylindrical bores with a suitable coating such as Nicasil. An exhaust passage (not shown) communicates with each cylinder 112 via the respective exhaust port. It is contemplated that the engine could have only two or more than three cylinders 112, in which case the valve assembly 100 would have a corresponding number of valves 120 operatively connected to the single housing 132. An exhaust manifold 114 has three inlets (not shown) fluidly connected to the three exhaust passages and a single outlet 116, and is sometimes referred to as a "three into one" manifold. As can be seen, the exhaust manifold 114 is disposed between the housing 132 and the crankshaft 108.

As can be seen, the crankshaft 108 extends vertically, the cylinders 112 extend horizontally, and the outlet 116 of the exhaust manifold 114 points downwardly. This is because the engine shown in part in FIG. 6 is suitable for use with an outboard engine. However, it is contemplated that this engine could have other applications and that the valve assembly 100 could be used on other types of engines.

Figure 5:
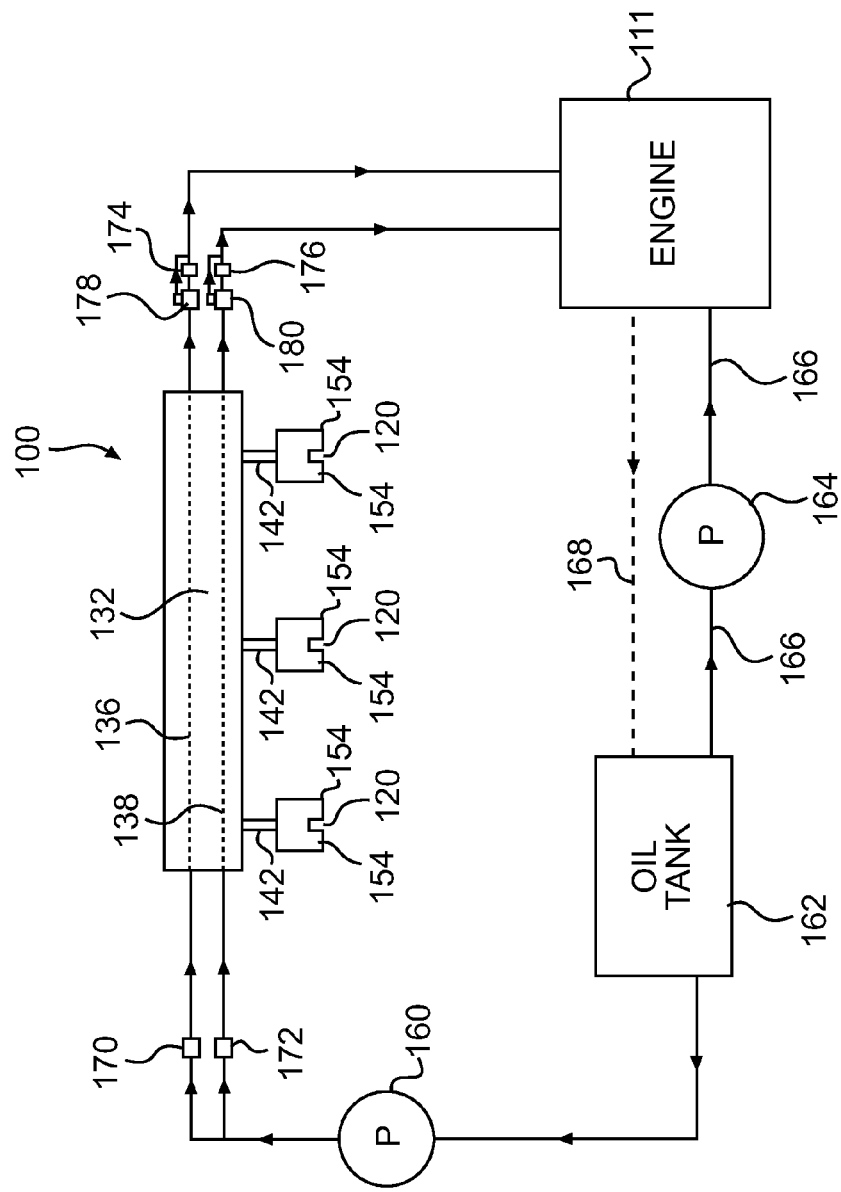
FIG. 5 is a schematic diagram of a hydraulic/lubrication system associated with an engine having the cylinder block, exhaust manifold, and valve assembly of FIG. 4.
Figure 6A:
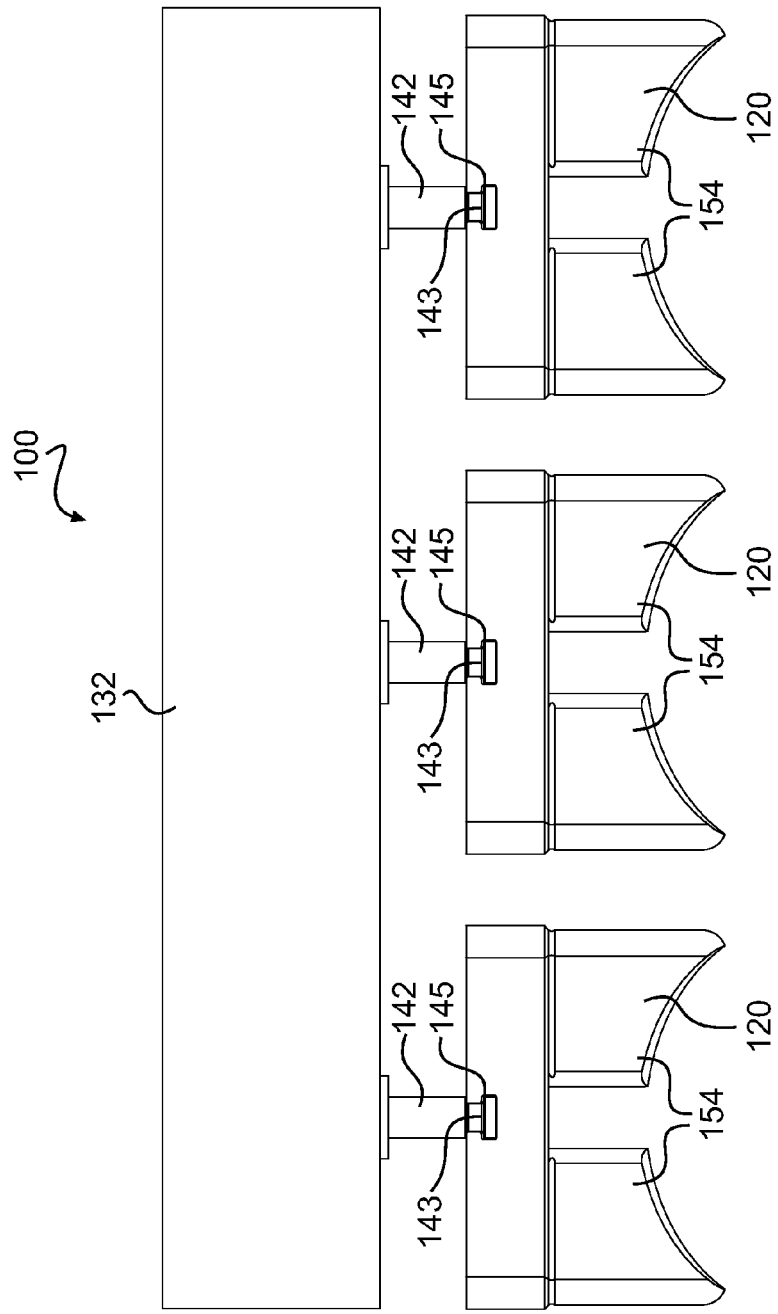
FIG. 6A is a side elevation view of the valve assembly of FIG. 4.
Figure 6B:
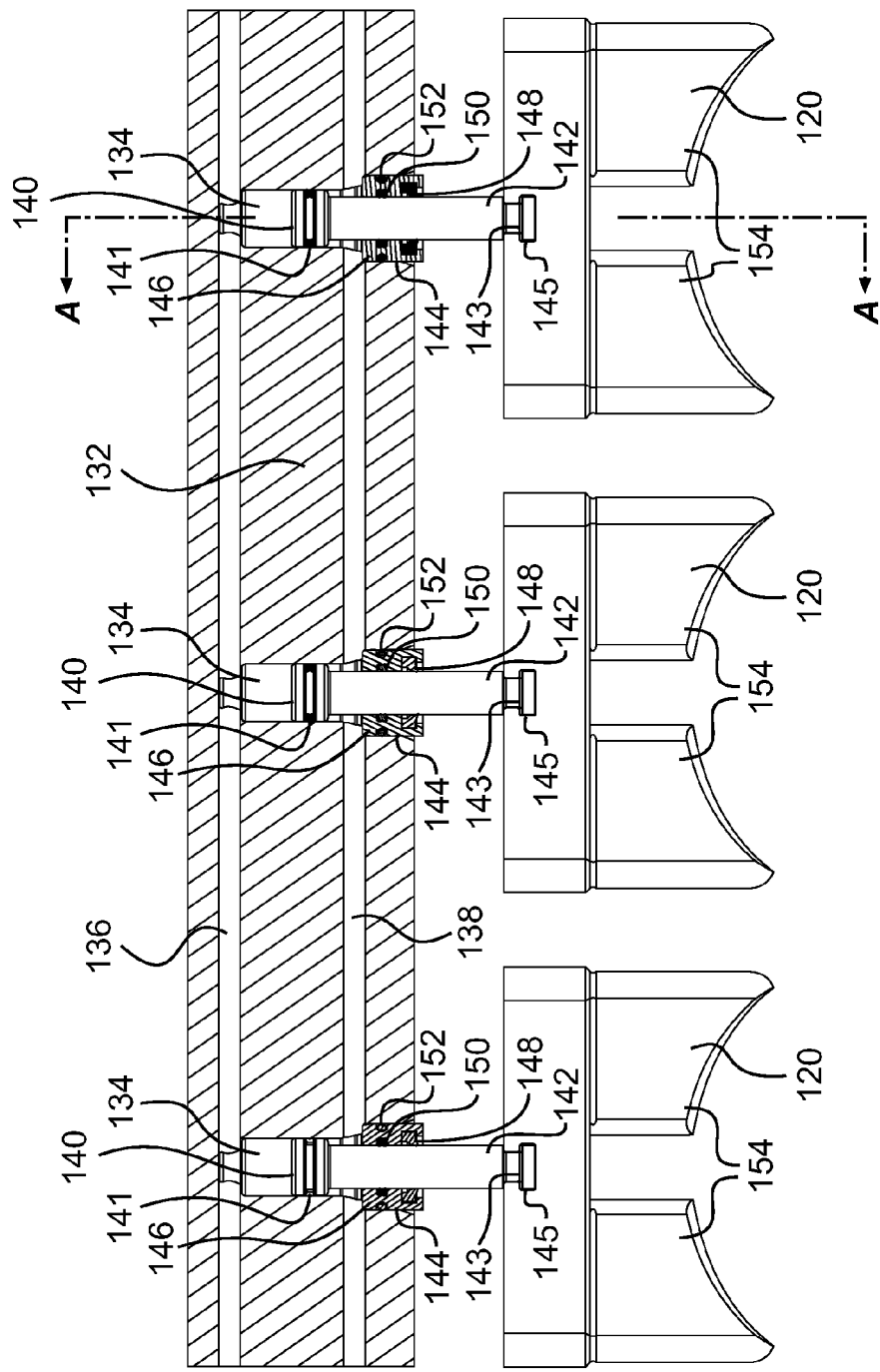
FIG. 6B is a partial cross-sectional view of the valve assembly of FIG. 4.
Figure 7:
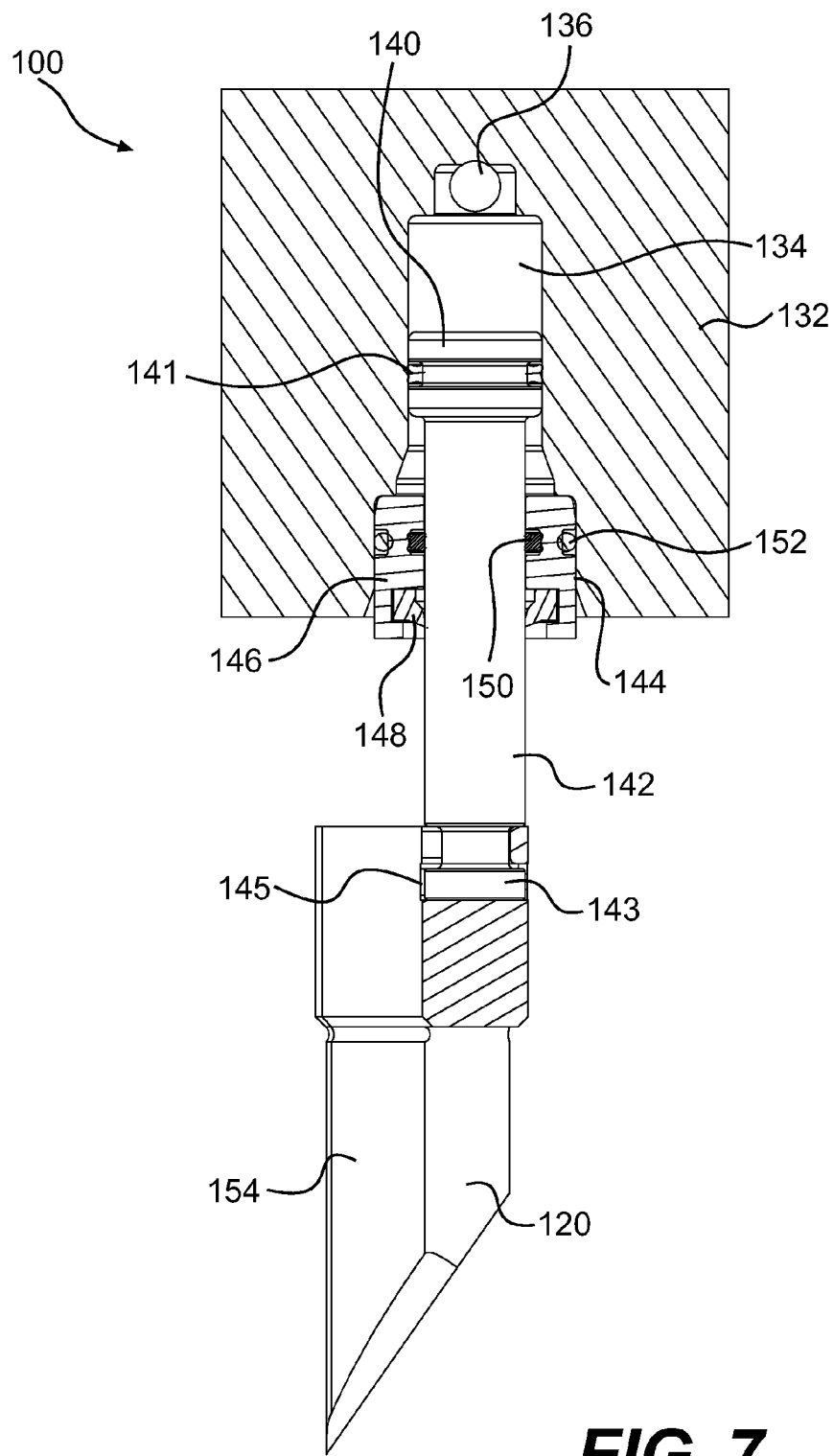
FIG. 7 is a cross-sectional view of the valve assembly of FIG. 4 taken through line A-A of FIG. 6B.

Turning now to FIGS. 6A to 7, the valve assembly 100 will be described in more detail. The housing 132 defines three chambers 134, a first fluid line 136 and a second fluid line 138. The first and second fluid lines 136, 138 fluidly communicate the three chambers 134 in series with a fluid pump 160 (FIG. 5) so as to supply hydraulic fluid to the chambers 134 as described below. An actuator piston 140 is disposed in each of the chambers 134 and is slidable therein. An O-ring 141 disposed around each actuator piston 140. The O-rings 141 prevent hydraulic fluid present in the chambers 134 from flowing around the actuator pistons 140 from one side of the actuator pistons 140 to the other. The actuator pistons 140 and the chambers 134 are cylindrical, however, it is contemplated that they could have other shapes. Each actuator piston 140 is mounted onto an end of a corresponding connector 142. The connectors 142 extend from the housing 132 and connect to their corresponding valve 120, such that as the actuator pistons 140 slide inside the chambers 134, the connectors 142 and the valves 120 move with the actuator pistons 140. In the embodiment shown, the ends 143 of the connectors 142 are received in slots 145 formed in the valves 120, however it is contemplated that they could be otherwise connected. For example, the connectors 142 and the valves 120 could be integrally formed.

The housing 132 also defines three passages 144 therein. As can be seen, the passages 144 extend from an outer surface of the housing 132 to their corresponding chambers 134 and are coaxial therewith. The diameters of the passages 144 are greater than the diameters of the chambers 134 in order to facilitate the insertion of the actuator pistons 140 into the chambers 134 when assembling the valve assembly 100. An annular cap 146 is disposed inside each one of the passages 144 around the corresponding connector 142 is order to guide the connectors 142 as they move with the actuator pistons 140. A seal 148 and an O-ring 150 are disposed between each one of the annular caps 146 and the corresponding connector 142. Another O-ring 152 is disposed between each one of the annular caps 146 and the wall of the corresponding passage 144. The seals 148 and the O-rings 150, 152 prevent hydraulic fluid present in the chambers 134 from flowing outside the housing 132 via the passages 144.

The valves 120 each have two protrusions 154. This is due to the exhaust ports of the engine for which the valve assembly 100 is designed being separated in two portions by the cylinder liner. It is contemplated the valves 120 may have any shape suitable for the engine for which they are to be used. It is contemplated that each valve 120 could also be a multi-part valve such as the valve described in United States Patent Publication No. 2009/0088942 A1, published Apr. 2, 2009. As can be seen, the valve assembly 100 is not provided with springs such as the spring 56 described above with respect to the valve assembly 10. However it is contemplated that such a spring could be provided.

Turning now to FIG. 5, the hydraulic/lubrication system associated with the valve assembly 100 and an associated engine 111 will be described. Although the valve assembly 100 is shown as being separate from the engine 111, it should be understood that this has been done for ease of understanding, and that the valve assembly 100 is mounted to the engine 111 in a manner similar to the manner shown in FIG. 4. Furthermore, although FIG. 5 illustrates the valve assembly 100 as using lubricant from the engine's lubrication system as the hydraulic fluid for actuating the valves 120, it is contemplated that the valve assembly 100 could be supplied with hydraulic fluid from a dedicated pump and hydraulic fluid reservoir. Using lubricant from the engine's lubrication system as the hydraulic fluid for actuating the valves 120 as shown in FIG. 5 provides the advantage of lubricating the components of the valve assembly 100 as the valves 120 are being actuated. Therefore, there is no need to provide a separate system for lubricating the valve assembly 100. However, it is contemplated that such a separate lubrication system could be provided in cases where engine lubricant is not used as hydraulic fluid.

An oil tank 162 stores the lubricant to be used by the engine 111 and the valve assembly 100. A pump 164 pumps lubricant to the engine 111 via lines 166 for lubricating the engine 111. Since the engine 111 is a two-stroke engine, the lubricant is combusted by the engine 111. However, it is contemplated that only a portion of the lubricant could be combusted, and that excess lubricant could be returned to the oil tank 162 via line 168.

The pump 160 pumps lubricant from the oil tank 162 to the fluid lines 136, 138. Hydraulic valves 170, 172 control the flow of lubricant from the pump 160 to the fluid lines 136, 138, respectively. From the fluid lines 136, 138, the lubricant flows to the engine 111. Hydraulic valves 174, 176 control the flow of lubricant from the fluid lines 136, 138, respectively, to the engine 111. A pressure release valve 178 is disposed between the housing 132 and the valve 174 and is in fluid communication with the fluid line 136. The pressure release valve 178 opens to allow lubricant to bypass the valve 174 when the valve 174 is closed and the pressure inside the fluid line 136 exceeds a predetermined level. Similarly, a pressure release valve 180 is disposed between the housing 132 and the valve 176 and is in fluid communication with the fluid line 138. The pressure release valve 180 opens to allow lubricant to bypass the valve 176 when the valve 176 is closed and the pressure inside the fluid line 138 exceeds a predetermined level.

When the engine 111 is operating at low or medium speeds, the valves 170 and 176 are opened, the valves 172 and 174 are closed, and the fluid pump 160 supplies lubricant to the chambers 134 via the fluid line 136. This causes the actuator pistons 140 to move toward the annular caps 146 as shown. As a result, the valves 120 move to a flow restricting position.

When the engine 111 is operating at high speeds, the valves 172 and 174 are opened, the valves 170 and 176 are closed, and the fluid pump 160 supplies lubricant to the chambers 134 via the fluid line 138. This causes the actuator pistons 140 to move away from the annular caps 146. As a result, the valves 120 move to a full flow position.

Figure 8:
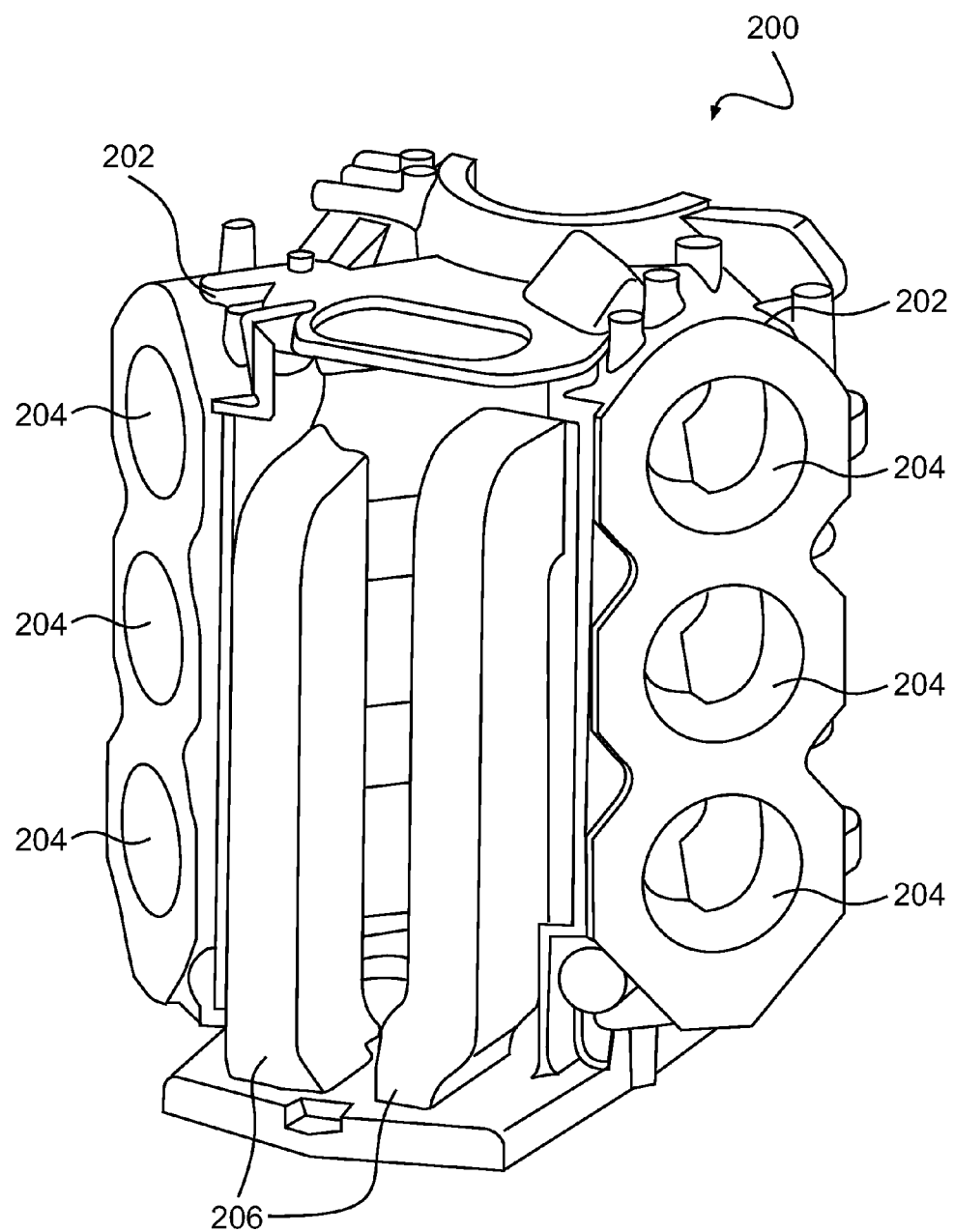
FIG. 8 is a perspective view of a cylinder block having two exhaust manifolds connected thereto to which the first or the second valve assembly could be connected.

FIG. 8 illustrates a cylinder block 200 for a V-type engine having two cylinder banks 202 of three cylinders 204 each. Each cylinder bank 202 has an exhaust manifold 206 connected to the exhaust ports of the corresponding cylinders 204. The exhaust manifolds 206 are sometimes referred to as "log type" manifolds. It is contemplated that an engine having the cylinder block 200 could use either one of the valve assembly 10 and the valve assembly 100. In either case, the valve assemblies 10 or 100 would be disposed on the same side of the cylinders 204 as the manifolds 206 such that the manifolds are disposed between the valve assemblies 10 or 100 and the crankshaft (not shown) of the engine. In the case where the valve assembly 10 is used, each cylinder 204 is provided with a valve assembly 10 (i.e. six assemblies 10). In the case where the valve assembly 100 is used, each cylinder bank 202 is provided with a valve assembly 100 (i.e. two assemblies 100).

Turning now to FIGS. 9 to 12, other embodiments of valve assemblies, valve assemblies 300A and 300B, will be described. Each of the valve assemblies 300A and 300B has three valves (not shown) operatively connected to a corresponding housing 332A and 332B respectively. Although not shown, it is contemplated that the valves of the valve assemblies 300A and 300B could be similar to the valves 20 or 120 described above or to any other suitable type of valve.

Figure 11:
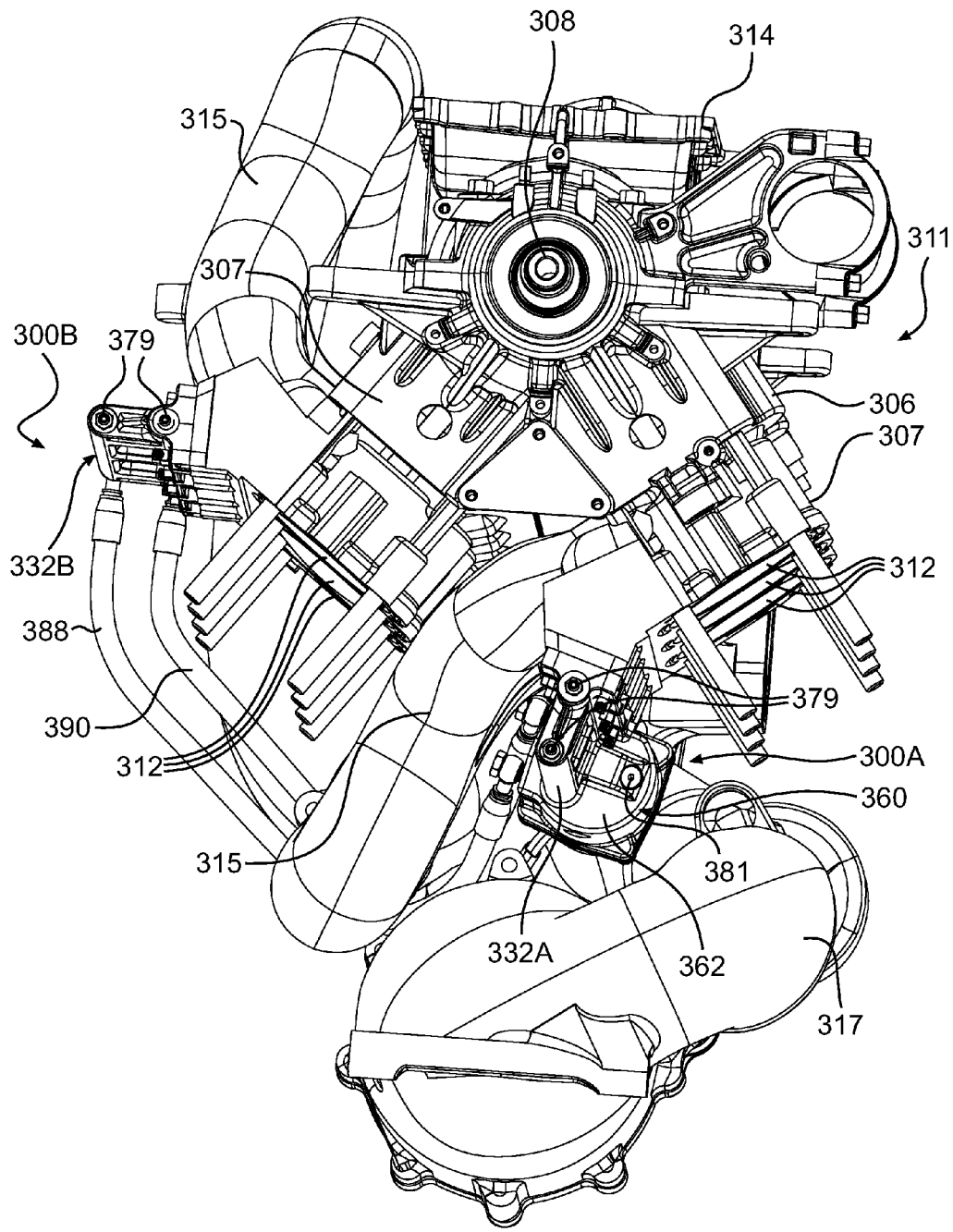
FIG. 11 is a top view on an engine having two valve assemblies of FIG. 9 mounted thereon.

As seen in FIG. 11, the valve assemblies 300A and 300B are provided on a two-stroke engine 311 (note that the cylinder heads are not shown). The engine 311 comprises a crankcase 314 and a cylinder blocks 306 connected to the crankcase 314. The cylinder block 306 has two cylinder banks 307 disposed at an angle to each other. Three cylinders 312 are disposed in each cylinder bank 307 and each cylinder 312 has an exhaust port (not shown). It should be understood that the two-stroke engine 311 may have more or less than three cylinders 312 per cylinder bank 307, in which case the valve assemblies 300A and 300B would have a corresponding number of valves. The cylinders 312 may be formed in the cylinder block 306 in any suitable manner known in the art. Exhaust passages (not shown) communicate with the cylinders 312 via the exhaust ports. Each cylinder bank 307 has a corresponding exhaust manifold 315. Each exhaust manifold 315 has three inlets (not shown) fluidly connected to the three exhaust passages of its corresponding cylinder bank 307 and a single outlet (not shown). The outlet of the exhaust manifolds 315 are fluidly connected to an exhaust pipe 317. The crankcase 314 has an admission port (not shown) and an internal chamber (not shown). A crankshaft 308 is disposed in the internal chamber of the crankcase 314. A piston (not shown) is disposed in each cylinder 312. Each piston is connected to the crankshaft 308 via a connecting rod (not shown) and is reciprocable in the cylinder 312. Each piston is adapted to open or close its corresponding exhaust port and transfer port (not shown).

The engine 311 shown in FIG. 11 is suitable for use with an outboard engine. However, it is contemplated that this engine could have other applications and that the valve assemblies 300A and 300B could be used on other types of engines.

Figure 9:
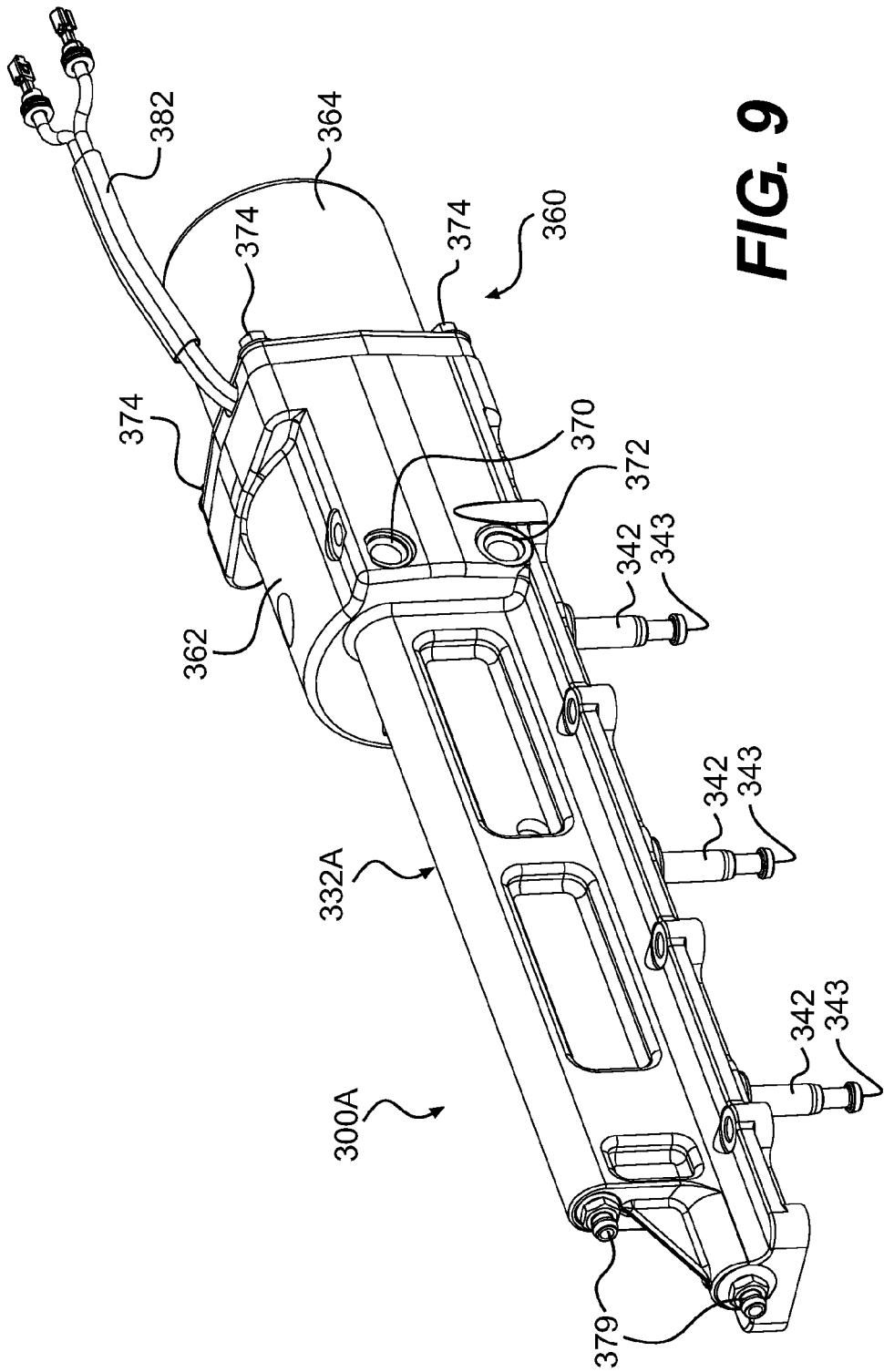
FIG. 9 is a perspective view of a third embodiment of a valve assembly.
Figure 10:
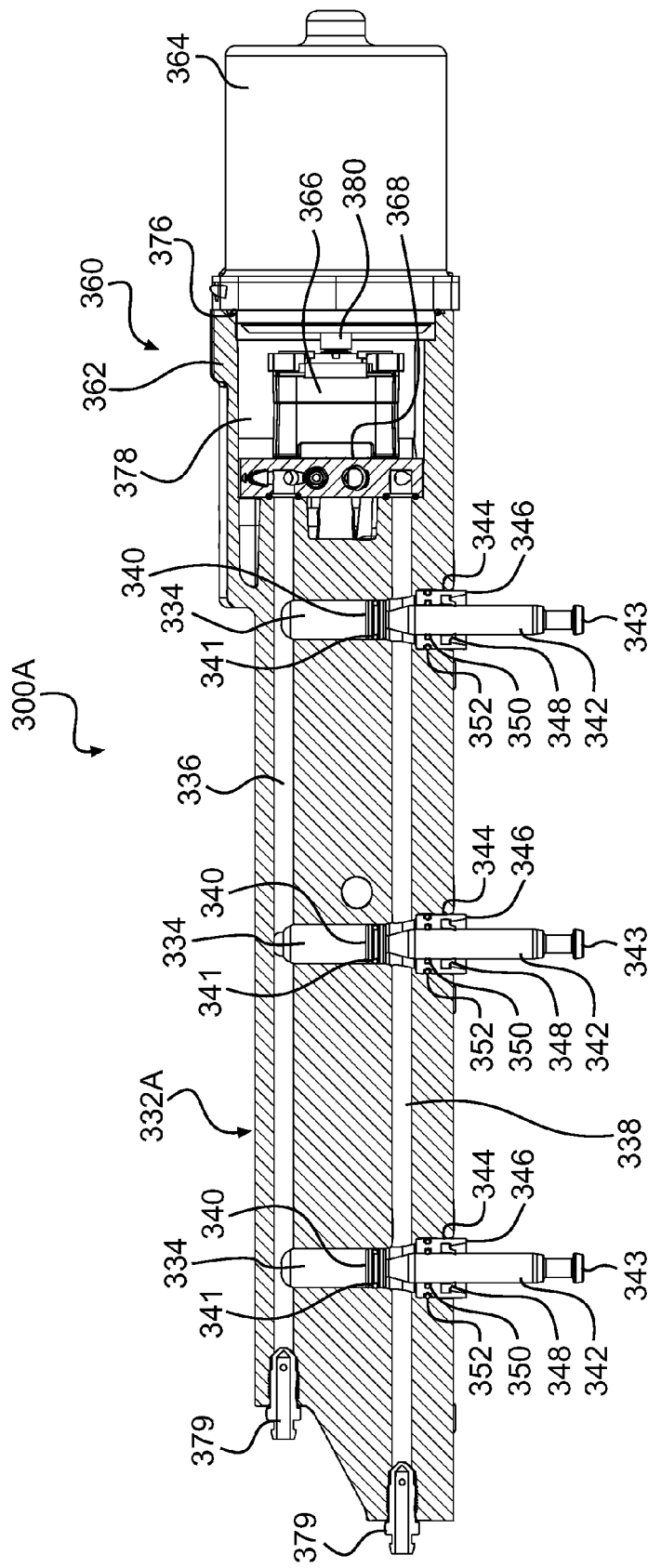
FIG. 10 is a cross-sectional view of the valve assembly of FIG. 9 taken longitudinal along a center of a housing of the valve assembly.

Turning now to FIGS. 9 and 10, the valve assembly 300A will be described in more detail. The housing 332A defines three chambers 334, a first fluid line 336 and a second fluid line 338. The first and second fluid lines 336, 338 fluidly communicate the three chambers 334 in series with a pumping unit 360 mounted directly to the housing 332A so as to supply hydraulic fluid to the chambers 334 as described below. An actuator piston 340 is disposed in each of the chambers 334 and is slidable therein. An O-ring 341 disposed around each actuator piston 340. The O-rings 341 prevent hydraulic fluid present in the chambers 334 from flowing around the actuator pistons 340 from one side of the actuator pistons 340 to the other. The actuator pistons 340 and the chambers 334 are cylindrical, however, it is contemplated that they could have other shapes. Each actuator piston 340 is mounted onto an end of a corresponding connector 342. The connectors 342 extend from the housing 332A. The valves are connected to the ends of their corresponding connector 342, such that as the actuator pistons 340 slide inside the chambers 334, the connectors 342 and the valves move with the actuator pistons 340. In the embodiment shown, the ends 343 of the connectors 342 are received in slots formed in the valves in a manner similar to the one described above with respect to the valve assembly 100, however it is contemplated that they could be otherwise connected. For example, the connectors 342 and the valves could be integrally formed.

The housing 332A also defines three passages 344 therein. As can be seen, the passages 344 extend from an outer surface of the housing 332A to their corresponding chambers 334 and are coaxial therewith. The diameters of the passages 344 are greater than the diameters of the chambers 334 in order to facilitate the insertion of the actuator pistons 340 into the chambers 334 when assembling the valve assembly 300A. An annular cap 346 is disposed inside each one of the passages 344 around the corresponding connector 342 is order to guide the connectors 342 as they move with the actuator pistons 340. A seal 348 and an O-ring 350 are disposed between each one of the annular caps 346 and the corresponding connector 342. Another O-ring 352 is disposed between each one of the annular caps 346 and the wall of the corresponding passage 344. The seals 348 and the O-rings 350, 352 prevent hydraulic fluid present in the chambers 334 from flowing outside the housing 332 via the passages 344.

The pumping unit 360 associated with the valve assembly 300A will now be described. As can be seen in FIG. 10, the pumping unit 360 includes a pump housing 362, an electric motor 364, a pump 366 and a valve unit 368. The pump housing 362 is integrally formed with the housing 332A.

The pump housing 362 has two apertures 370, 372 (FIG. 9) on a side thereof to fluidly connect the pumping unit 360 to the valve assembly 300B, as will be described below, to allow the pumping unit 360 to operate the valves of the valve assembly 300B. It is contemplated that for an engine having a single cylinder bank, that only the valve assembly 300A would be used, in which case the apertures 370, 372 would be capped. It is also contemplated that instead of using both the valve assemblies 300A and 300B which are fluidly connected to each other, that the engine 311 could be provided with two valve assemblies 300A, in which case the apertures 370, 372 would also be capped.

The valve unit 368 is disposed inside the housing adjacent to the ends of the first and second fluid lines 336, 338. The valve unit 368 consists of a plurality of valves which fluidly communicated with the first and second fluid lines 336, 338 and the apertures 370, 372 to control the flow of hydraulic fluid from the pump 366 and in and out of the fluid lines 336, 338 and apertures 370, 372.

The electric motor 364 is fastened to the end of the pump housing 362 via fasteners 374 (FIG. 9). A seal 376 is disposed between the pump housing 362 and the electric motor 364. The pump housing 362 and the electric motor 364 form a hydraulic fluid reservoir 378 therebetween. Bleed valves 379 provided on the ends of the fluid lines 336, 338 allow hydraulic fluid to be bled from the housing 332A and reservoir 378. The housing 332A and reservoir 378 to be refilled with hydraulic fluid afterward via an aperture normally closed by plug 381. The electric motor 364 can be operated to rotate its shaft 380 in both directions. Electrical wires 382 (FIG. 9) connected to the electrical power supply of the engine 311 supply electrical power to the electric motor 364.

The pump 366 is disposed inside the reservoir 378. The pump 366 is connected to the shaft 380 so as to be driven by the electrical motor 364. When it is operating, the pump 364 supplies hydraulic fluid to the first fluid line 336 and the aperture 370 or to the second fluid line 338 and the aperture 372 depending on the direction of rotation of the shaft 380 as will be described below.

Figure 12:
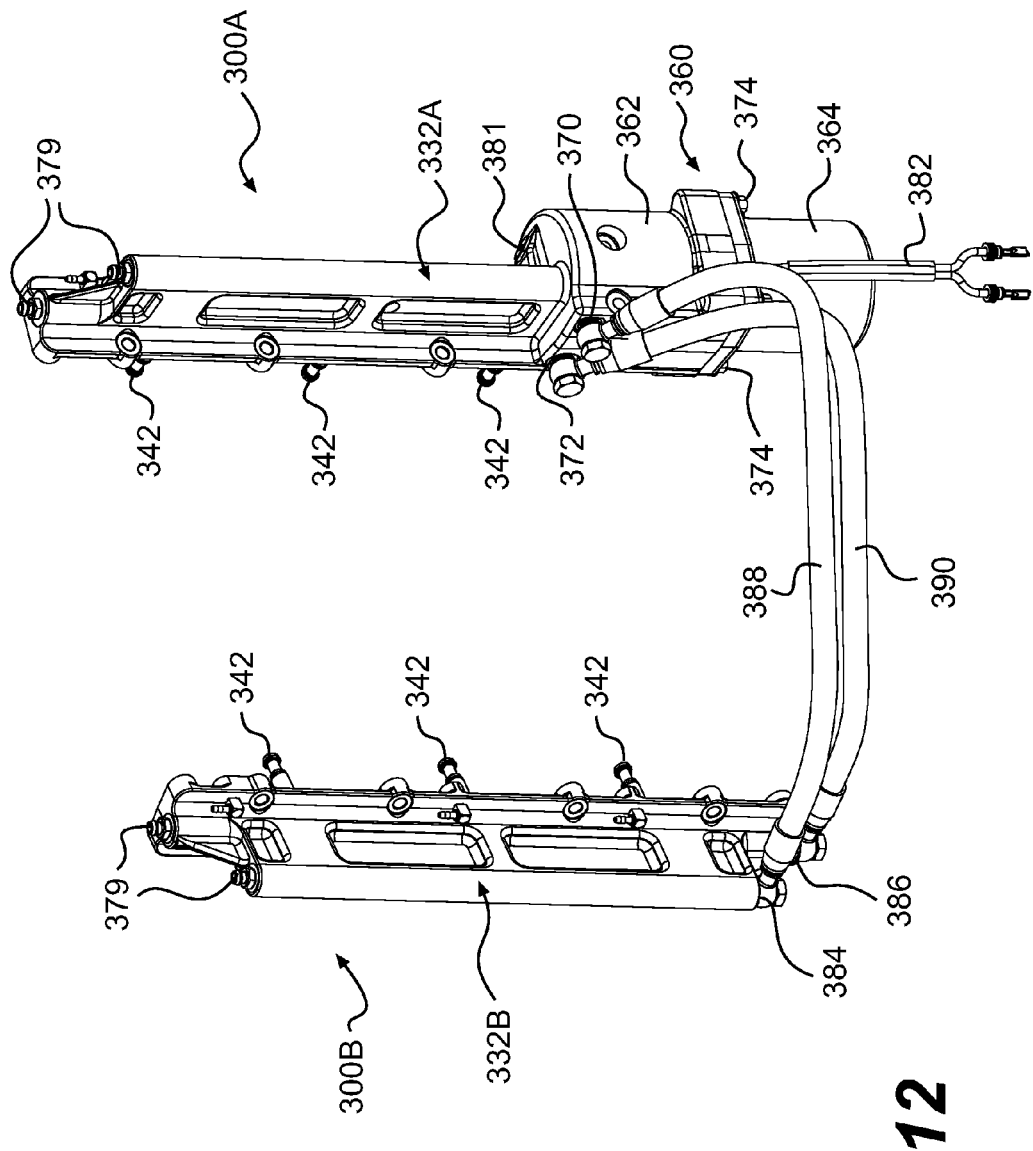
FIG. 12 is a perspective view of the two valve assemblies of FIG. 11.

Turning now to FIG. 12, the valve assembly 300B will now be described. The valve assembly 300B has all of the same features and components as the valve assembly 300A except that it is not provided with a pumping unit 360. As a result, the housing 332B differs from the housing 332A. As the other features and components of the valve assembly 300B are the same as those of the valve assembly 300A, they will not be described again and, to the extent that they are visible in the figures, they have been labelled with the same reference numerals. Since the valve assembly 300A does not have a pumping unit 360, the housing 332B is not provided with a pump housing 362. Instead, the housing 332B has two apertures 384 and 386. The aperture 384 fluidly communicates with a fluid line of the housing 332B corresponding to the first fluid line 336 of the housing 332A. The aperture 386 fluidly communicates with a fluid line of the housing 332B corresponding to the second fluid line 338 of the housing 332A. A hose 388 connects the aperture 384 of the housing 332B to the aperture 370 of the housing 332A. A hose 390 connects the aperture 386 of the housing 332B to the aperture 372 of the housing 332A.

When the engine 311 is operating at low or medium speeds, the electrical motor 364 turns the shaft 380 in a first direction. As a result, the pump 366 draws hydraulic fluid from the fluid line 338, the corresponding fluid line of the second housing 332B and the hose 390 and supplies hydraulic fluid to the chambers 334 of the first housing 332A via the fluid line 336, and to the corresponding chambers of the second housing 332B via the hose 388 and the corresponding fluid line of the second housing 332B. Excess hydraulic fluid is returned to the reservoir 378. In case that there is not enough hydraulic fluid, the pump 366 draws hydraulic fluid from the reservoir 378. The valves of the valve unit 368 are opened or closed as the case may be to permit this flow. This causes the actuator pistons 340 to move toward the annular caps 346 in both valve assemblies 300A and 300B. As a result, the valves in both valve assemblies 300A and 300B move to a flow restricting position.

When the engine 311 is operating at high speeds, the electrical motor 364 turns the shaft 380 in a second direction opposite the first direction. As a result, the pump 366 draws hydraulic fluid from the fluid line 336, the corresponding fluid line of the second housing 332B and the hose 388 and supplies hydraulic fluid to the chambers 334 of the first housing 332A via the fluid line 338, and to the corresponding chambers of the second housing 332B via the hose 390 and the corresponding fluid line of the second housing 332B. Excess hydraulic fluid is returned to the reservoir 378. In case that there is not enough hydraulic fluid, the pump 366 draws hydraulic fluid from the reservoir 378. The valves of the valve unit 368 are opened or closed, as the case may be, to permit this flow. This causes the actuator pistons 340 to move away from the annular caps 346 in both valve assemblies 300A and 300B. As a result, the valves in both valve assemblies 300A and 300B move to a full flow position.

In an exemplary embodiment of the engine 311, low or medium speeds of operation of the engine 311 correspond to engine speeds of 3000 RPM or less and high speeds of operation of the engine correspond to engine speeds of more than 3000 RPM. However, it should be understood that the speed ranges at which the valves are in a flow restricting position or a full flow position will depend on the specific characteristics of the engine 311 and the desired operation characteristics. Therefore, speed ranges different from the ones described above are contemplated.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. An internal combustion engine comprising:
   a crankcase;
   a crankshaft disposed in the crankcase;
   a cylinder block connected to the crankcase;
   first and second cylinders disposed in the cylinder block, the first cylinder having a first exhaust port, the second cylinder having a second exhaust port;
   a first piston movably disposed within the first cylinder and a second piston movably disposed within the second cylinder, the first and second pistons being operatively connected to the crankshaft;
   a valve assembly connected to the cylinder block, the valve assembly comprising:
   a first connector;
   a first actuator piston connected to the first connector, the first actuator piston being disposed in a first chamber;
   a first valve connected to the first connector,
   the first connector, the first actuator piston and the first valve being movable together between a first position where the first valve extends a first distance in the first exhaust port and a second position where the first valve extends a second distance in the first exhaust port, the second distance being less than the first distance;
   a second connector;
   a second actuator piston connected to the second connector, the second actuator piston being disposed in a second chamber;
   a second valve connected to the second connector,
   the second connector, the second actuator piston, and the second valve being movable together between a first position where the second valve extends a first distance in the second exhaust port and a second position where the second valve extends a second distance in the second exhaust port, the second distance being less than the first distance;
   a first fluid line supplying hydraulic fluid in the first chamber on a first side of the first actuator piston to move the first connector, the first actuator piston and the first valve toward the first position,
   the first fluid line also supplying hydraulic fluid in the second chamber on a first side of the second actuator piston to move the second connector, the second actuator piston and the second valve toward the first position; and
   a second fluid line supplying hydraulic fluid in the first chamber on a second side of the first actuator piston to move the first connector, the first actuator piston and the first valve toward the second position, the second fluid line also supplying hydraulic fluid in the second chamber on a second side of the second actuator piston to move the second connector, the second actuator piston and the second valve toward the second position; and at least one fluid pump supplying hydraulic fluid to the first and second fluid lines.

2. The engine of claim 1, further comprising a housing defining therein the first chamber, the second chamber, the first fluid line, and the second fluid line.

3. The engine of claim 2, wherein the housing is connected to the cylinder block.

4. The engine of claim 3, further comprising an exhaust manifold connected to the cylinder block and fluidly connected to the first and second exhaust port;

wherein the exhaust manifold is disposed between the housing and the crankshaft.

5. The engine of claim 1, further comprising:

a third cylinder disposed in the cylinder block, the third cylinder having a third exhaust port; and a third piston movably disposed within the third cylinder, the third piston being operatively connected to the crankshaft;

wherein the valve assembly further comprises:

a third connector;

a third actuator piston connected to the third connector, the third actuator piston being disposed in a third chamber;

a third valve connected to the third connector, the third connector, the third actuator piston and the third valve being movable together between a first position where the third valve extends a first distance in the third exhaust port and a second position where the third valve extends a second distance in the third exhaust port, the second distance being less than the first distance;

wherein the first fluid line also supplies hydraulic fluid in the third chamber on a first side of the third actuator piston to move the third connector, the third actuator piston and the third valve toward the first position; and wherein the second fluid line also supplies hydraulic fluid in the third chamber on a second side of the third actuator piston to move the third connector, the third actuator piston and the third valve toward the second position.

6. The engine of claim 1, further comprising:

a first hydraulic valve selectively fluidly communicating the first fluid line with the at least one fluid pump; and a second hydraulic valve selectively fluidly communicating the second fluid line with the at least one fluid pump.

7. The engine of claim 1, further comprising a hydraulic fluid reservoir fluidly communicating with the at least one fluid pump for supplying hydraulic fluid to the at least one fluid pump.

8. The engine of claim 7, wherein the hydraulic fluid reservoir is a lubricant reservoir and the hydraulic fluid is a lubricant used to lubricate the engine.

9. The engine of claim 1, wherein the valve assembly further comprises:

a first spring biasing the first connector, the first actuator piston and the first valve toward one of the first position, the second position and a third position, the third position being intermediate the first and second positions; and a second spring biasing the second connector, the second actuator piston and the second valve toward one of the first position, the second position and a third position, the third position being intermediate the first and second positions.

* * * * *